March 20, 1945.  A. BONDAR  2,371,673
AIRCRAFT LOCKING MECHANISM
Filed April 4, 1941  3 Sheets-Sheet 1

ARSENE BONDAR
INVENTOR.
BY James M. Clark
ATTORNEY

March 20, 1945.  A. BONDAR  2,371,673
AIRCRAFT LOCKING MECHANISM
Filed April 4, 1941  3 Sheets-Sheet 2
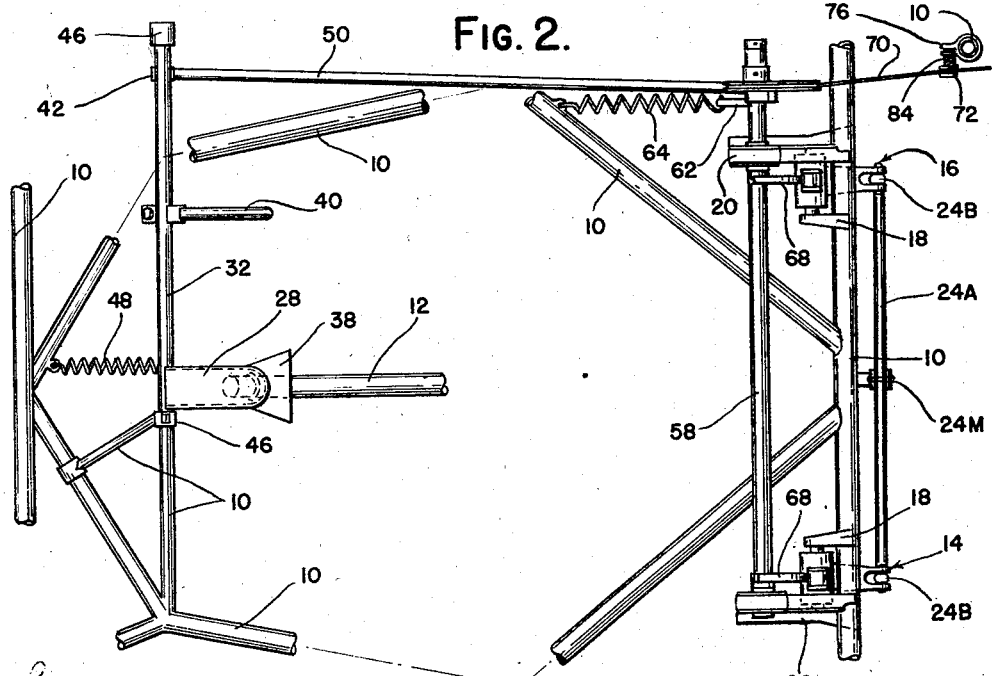
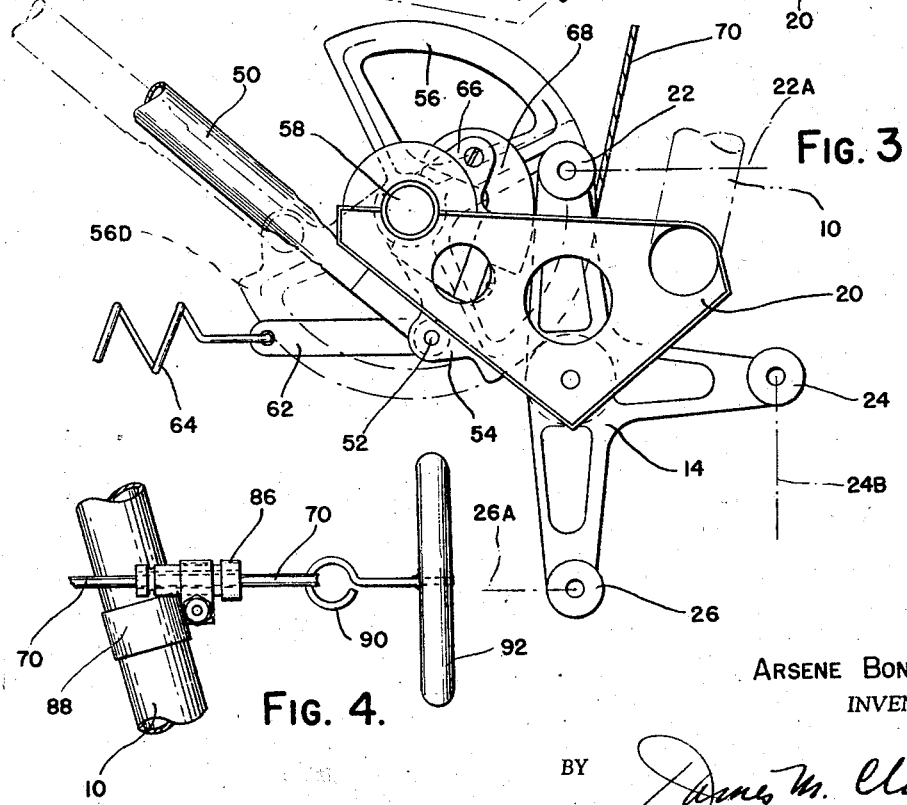
ARSENE BONDAR
INVENTOR.
BY James M. Clark
ATTORNEY.

March 20, 1945.　　　　A. BONDAR　　　　2,371,673
AIRCRAFT LOCKING MECHANISM
Filed April 4, 1941　　　3 Sheets-Sheet 3
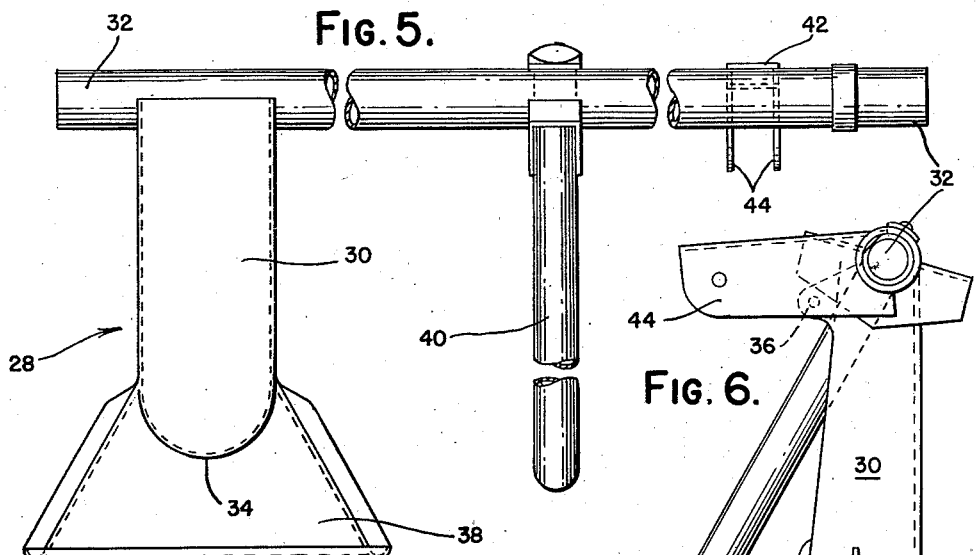
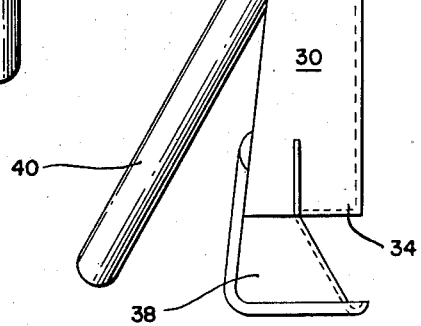
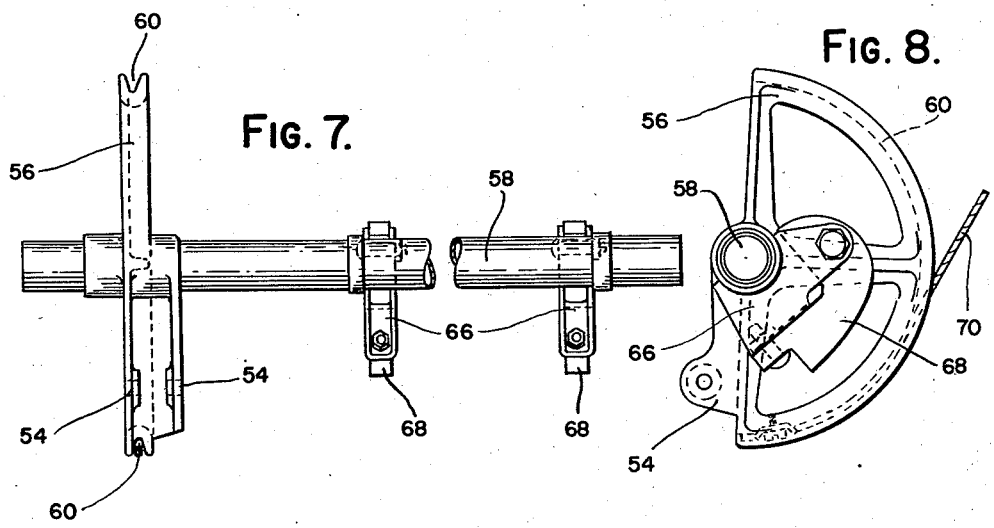
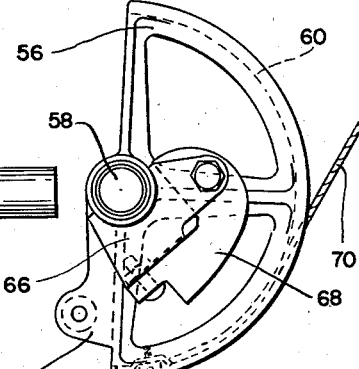
ARSENE BONDAR
INVENTOR.
BY *Jesse M. Clark*
ATTORNEY.

Patented Mar. 20, 1945

2,371,673

UNITED STATES PATENT OFFICE 2,371,673

AIRCRAFT LOCKING MECHANISM

Arsene Bondar, Huntington, N. Y., assignor to Fairchild Engine and Airplane Corporation, a corporation of Maryland Application April 4, 1941, Serial No. 386,780

13 Claims. (Cl. 244—83)

This invention relates to locking means for the control surfaces of aircraft and more particularly to arrangements by which such surfaces may be locked against operation for the prevention of damage thereto and for other purposes.

When aircraft are left standing or parked with no one at the controls, the control surfaces are susceptible to damage by being flapped up and down or from side to side under the influence of wind gusts. Even where the surfaces themselves are not directly injured, the control system is subjected to excessive wear and might be forced through limits of movement which the system could not safely undergo without serious strain.

As aircraft control systems are usually constituted, there are three main sets of surfaces which are subject to this undesired action and each are included within the operation of my novel parking lock. These are the ailerons, elevators and rudder. Many aircraft are also equipped with steerable tail wheels operated conjointly with the rudder and in such instances it is desirable that the control lock also be capable of locking this unit in the neutral position.

Accordingly it is a principal object of this invention to provide lock means which can operate to prevent undesired movement of any or all of the major control elements of an aircraft.

Many aircraft now being produced are equipped with dual controls in tandem and it therefore is desirable that any lock arrangement installed in connection therewith be operable from either control position. Therefore it is a further object of this invention to provide a lock arrangement operable from at least two control positions.

Another object of this invention is to provide a locking device for the control surfaces of such character that the condition of the controls, whether locked or unlocked, is necessarily impressed on the pilot prior to the beginning of any flight operation.

Still another object is the provision of means to prevent accidental engagement of the lock and of means for automatically centering and locking the rudder and its associated swivelable tail wheel.

Other objects and advantages will be more particularly pointed out hereinafter or will become apparent through a reading of the following description taken in conjunction with the drawings in which;

Fig. 2 is a plan view of the left hand portion of Fig. 1;

Fig. 3 is a side elevation, enlarged, of a portion of the mechanism of Fig. 1;

Fig. 4 is a side elevation, enlarged, of another portion of the mechanism of Fig. 1;

Fig. 5 is an enlarged plan of still another portion of the mechanism as seen in Fig. 2;

Fig. 6 is an end elevation of the control lock element of Fig. 5;

Fig. 7 is an end elevation, enlarged, of a portion of the sub-assembly shown in Fig. 3; and Fig. 8 is a side elevation of the unit shown in Fig. 7 as seen in Fig. 3.

Figure 1:
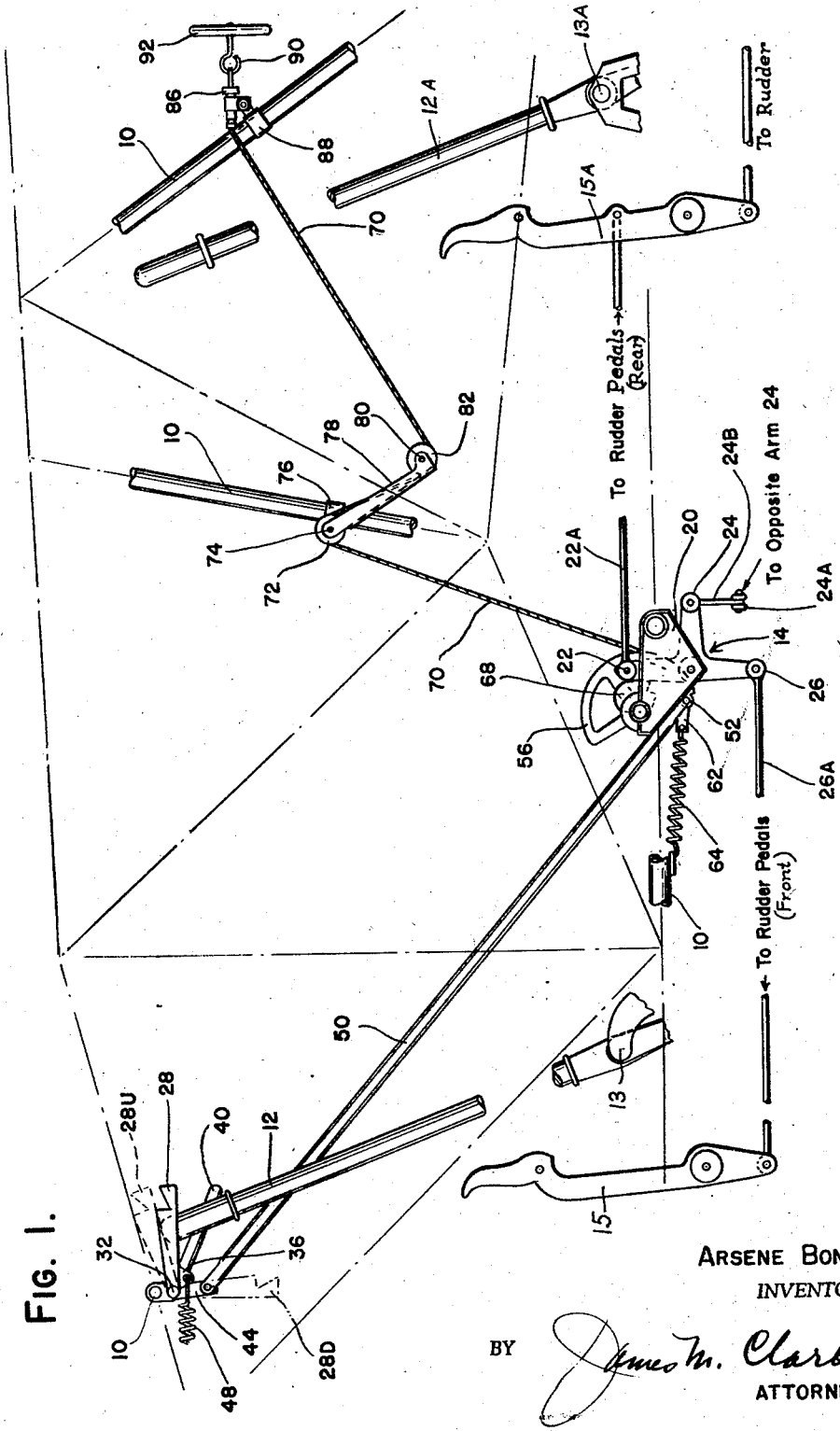
Fig. 1 is a side elevation showing the elements of the control surface lock in their operative relationship.

Referring to the drawings in detail, there is shown in Figs. 1 and 2 a phantom outline indicating a portion of an aircraft body structure in connection with which the various elements comprising the present invention are illustrated in their relative positions with respect to the structure as well as with respect to each other. Certain portions of this structure utilized for the mounting of these elements are shown in full outline and are designated individually and collectively by the numeral 10.

In aircraft employing the three-control-surface system comprised of ailerons, elevators and one or more conjointly operated rudder surfaces, it is usual to provide a control or "joystick" by means of which the ailerons and elevators can be independently or conjointly operated as is well known in the art. This mechanism does not form a part of the present inventive concept and is therefore not fully shown. For the same reason the details of foot pedals for the control of the rudder are not shown and only so much of the associated rod transmission is set forth as is necessary to show the manner in which the present lock engages the control system for the purpose of preventing movement thereof. Therefore at 12 in Figs. 1 and 2 is shown the hand grip end of such a "joystick," pivotally supported at 13, while at 14 and 16 are shown bellcrank levers intermediately a part of the operating rod system of the rudder. These bellcrank levers are journalled respectively between pairs of bracket arms 18 and bracket plates 20 projecting from one of the transverse structural members 10. Each of these bellcranks is formed with three lever arms as shown, designated 22, 24 and 26 respectively, and at the extremities of these arms are apertures for the attachment of the rudder operating rods. That is, each arm 26 is connected by rods 26A to its associated rudder pedal 15 and each arm 22 is connected by rod 22A through suitable linkage of any known type to its respective rudder operating horn, or in the case of a dual controlled airplane, as further described below, to the rear rudder pedals 15A. The structure so far described is conventional. On the other hand, the arms 24 are interconnected by a transverse lever 24A pivotally mounted at its mid-point 24M and having its terminals each spaced below the lever ends 24 and connected thereto by short vertical links 24B whereby rotation imparted to one of the operating levers 14 or 16 beyond its neutral position causes rotation of the other lever into its correspondingly opposite position.

The present invention consists in part of a control stick retainer 28 shown in detail in Figs. 5 and 6. This unit may conveniently be formed from sheet metal with an elongated body portion 30 fastened at one end by welding to a shaft 32, adjacent to one end thereof. The body portion has a channel shaped cross section, being open from underneath, and bounded at the free end by a curved end wall 34 having an internal radius of curvature slightly greater than that of the hand grip on the end of the control stick 12. Extending outwardly from the bottom edge of the wall 34 is a flaring guide plate 38, also of channel section. Fixed to the shaft 32 near its midpoint is a rigid handle 40 of convenient length and finally near the opposite end of shaft 32 is fixed a fitting 42 providing a pair of apertured lugs 44. The shaft 32 at each of its ends is mounted for partial rotation in bearings 46 supported by certain of the structural members 10 as shown in Fig. 1. Furthermore, there is an apertured lug 36 projecting from the bottom of member 30 to which is connected a coil spring 48 which, at its opposite end, is anchored to the aircraft structure.

Pivotally attached between the lugs 44 is a push-pull tube 50 which extends downwardly and rearwardly to a pivotal connection at 52 between spaced lugs 54 projecting from a pulley sector 56. Referring primarily to Figs. 7 and 8, wherein the details of this member are shown, it is seen to be mounted on a shaft 58 being fixed thereto by any desired means. The sector extends over an arc of approximately 180° and in its arcuate face has formed a cable groove 60. Connected to the same point 52 is a link 62 from which a coil spring 64 extends to an anchorage on a portion of the aircraft structure 10. Also fixed on the shaft 58 near either end thereof are two identical supports 66 to which are rigidly affixed identical cam discs 68. The shaft 58 is rotatable and is mounted for this purpose in suitable bearings carried by the bracket plates 20. With this arrangement of parts assembled as shown in Fig. 2, the cams 68, each lie in the same vertical plane as one of the bell cranks and are so closely adjacent thereto that in certain positions of the cams there is an engagement with the respective lever arms 22.

Fastened in the groove 60 of the sector 56 is a cable 70 which is led upwardly to a pulley 72 mounted on a spindle 74 attached by a clamp 76 to the aircraft structure 10. Extending from the spindle 74 is a channeled arm 78 which at its opposite end carries a second spindle 80 for the support of a pulley 82. On the spindle 74 is a coil spring 84 (shown only in Fig. 2) which engages the arm 78 for the purpose of rotating it in a clockwise direction as far as possible within the limitation imposed by the slack in cable 70. In other words the spring-biased arm 78 is a means of taking up any slack occurring in cable 70.

After passing over the pulley 72, the cable 70 is led between the side flanges of arm 78, under the pulley 82 and then rearward and upward to enter the bore of a fairlead 86. This fairlead is mounted by means of a clamp 88 on a section of the aircraft structure 10. As shown in Figs. 1 and 4, the cable extends through the fairlead to connect to a wire loop 90 to which a hand grip 92 is attached. The cable arrangement 70 terminating in the hand grip 92 is only provided in aircraft having tandem cockpit arrangements and when such is the case, the grip 92 is located in the second or rearmost cockpit while all of the other mechanism described is located within or adjacent to the forward cockpit.

The lock of the present invention can be operated by use of the previously described handle 40 and if a tandem cockpit installation has been made, then it can also be operated by using the hand grip 92. In such a tandem cockpit, or dual control installation, there is provided a rear control stick 12A pivotally mounted at 13A, and a pair of rear rudder pedals 15A are provided with suitable pivotal connections to the corresponding bellcranks by means of the push-pull members 22A as well as by means of suitable mechanism extending in an aft direction to the rudder. In either event the operation of the lock is substantially the same, the only difference being that the manual force applied follows a different route to the point of utilization. Assuming first that operation is to be accomplished from the forward cockpit by the use of handle 40, this member is swung upward in a counterclockwise direction to cause the stick retainer 28 to swing upwardly from its normal position 28 against the action of the springs 48 and 64. Handle 40 is swung sufficiently far to bring the member 28 to the dotted position 28U. When in this position, the stick 12 can be moved forwardly by the operator using his other hand, to an extreme central position such that its end is guided by the flared flange 38 into the socket formed by the channel walls and curved end 34 of the retainer body 30. As soon as this condition has been attained, the handle 40 can be released to allow the spring 48 to pull the retainer 28 downwardly to snugly embrace the tip of the control stick 12. In this latter attitude the retainer locks the control stick against movement with the consequential result that the ailerons are locked in neutral while the elevators are locked in their fully depressed position. With the control stick so locked it is impossible to attempt to take off without instantly noticing the locked condition of the controls.

A coordinately important feature of the present invention is the arrangement for locking the rudder system automatically as a result of the locking of the control stick 12 in its forward neutral position. When the handle 40 is raised, the resulting rotation of shaft 32 affects the lugs 44 by causing rotation thereof and the resulting movement of push-pull tube 50 causes corresponding rotation of the pulley sector 56 from the dotted line position 56D in a counterclockwise direction. Since the sector is fixed to shaft 58, the latter is also rotated with the result that the two cams 68 swing upward in the counterclockwise direction. Inasmuch as these cams are formed with faces approximating in form a portion of a spiral curve and are mounted eccentric to shaft 58, such rotation will progressively decrease the clearance between the cam surfaces of each cam and the adjacent arms 22 of each of the bell cranks 14 and 16. Unless the rudder and rudder pedals are exactly centered, these bell cranks will occupy different rotational positions so that the arm 22 of one will be tilted forwardly while the arm 22 of the other will be tilted rearwardly depending upon the direction in which the rudder is deflected. Consequently unless the rudder is in neutral position the lever 22 which is tilted forwardly will be contacted by its adjacent cam 68 and forced rearwardly to the vertical position. At the same time, since the bell cranks 14 and 16 are interconnected through the rudder link system and have differential movement, the other arm 22 is forced forwardly to the vertical or midposition at which point further movement is prevented since both cams will be jammed against the respective arm 22. This effectually locks the rudder and its associated steerable tail wheel, if any, in the midposition until released by raising the handle 40 to allow the control stick 12 to be removed from the retainer 28. When so removed and the handle 40 is released, the springs 48 and 64 operate, with some gravitational assistance, to return the members 28 and 56 to the dotted line positions 28D and 56D. The cams 68 will then no longer interfere with movement of the bell cranks 14 and 16 and in consequence the rudder will be freed for normal operation.

If operation of the lock system is to be accomplished from the rear cockpit by the use of hand grip 92, the duplicate control lever 12A in the rear cockpit is grasped and moved to the forward central position and this action will then be reflected in a duplicate movement of the interconnected control stick 12 in the forward cockpit. At the same time the hand grip 92 should be pulled rearwardly to the full extent of its allowable motion. Then this pull transmitted through the cable 70 will act on the sector or cable drum 56, pulling it up into the full-line position shown in Fig. 1. This will bring the cams 68 into contact with the lever arms 22 just as was described previously. Furthermore, this pull will be transmitted by the tube 50 to the shaft 32 so that the stick retainer 28 will be rotated to the position 28U. After the control stick has been properly positioned under the socket of the member 28, the grip 92 can be released and the control system will be locked thereby as previously described. After release of the grip 92, the spring 84 will rotate the lever 78 to draw the resultant slack occurring in cable 70, back through the fairlead 86 to the position shown in Fig. 1.

When it is desired that the control system be unlocked from the rear pilot position the pilot grasps the grip 92 in his right hand pulling it rearwardly to its rear position in which it draws cable 70 upwardly and rearwardly rotating the pulley sector 56 in a counter-clockwise direction to its limiting position. This further rotation of the member 56 causes pull in a downward and rearward direction on the interconnecting rod 50 and similar further counter-clockwise rotation of the shaft 32 imparting rotation of the control stick lock into its dotted position as indicated at 28U. In the latter position the forward control stick 12 is released and becomes free to either swing rearwardly due to the normal centralizing tendency of the control system, or the pilot in the rear cockpit may free the forward control stick from its lock by concurrently pulling the rear control stick rearwardly. After this has been accomplished the hand grip 92 is released whereupon the spring 48 and 64 rotate the control stick lock into its dotted position 28D and the pulley sector 56 into its dotted position in Fig. 3 in which all three controls of the airplane are again unlocked.

With the arrangement described above it should now be apparent that the present control surface locking system can be locked or unlocked as desired from either the front or rear cockpits. It should also be apparent that various changes and modifications could be made, by one skilled in the art, in the present invention without departing from the spirit of the invention. As one possible example of such a variant, the locking cams 68 might be removed from the location shown in Fig. 1 adjacent to the operating levers 22 and placed further forward in the cockpit, in a position where the cams could act directly on the rudder pedals provided for operation by the pilot in controlling the rudder. Other variations might as readily be suggested. Furthermore, the drawings are intended to illustrate one suitable mechanical arrangement for the purpose of disclosing the invention and are not intended to be taken as a limitation of the invention as defined in the appended claims.

I claim:

1. In an airplane having a manually movable control stick and a pair of foot-operated levers for actuation of the rudder, a control lock mechanism comprising a member pivotally mounted upon the aircraft operable to engage the free end of said control stick to prevent movement thereof, rotatable cam means engageable with said rudder operating levers to prevent movement thereof and an interconnection between said pivoted member and said cam means to cause rotation of the latter and the simultaneous locking of said levers.

2. In an airplane having flight control surfaces and operating levers in the systems controlling said surfaces, a control lock mechanism comprising a transverse rotatable shaft, a pilot operated member for rotating said shaft, a socket member connected to rotate with said shaft adapted to receive in locking engagement one of said operating levers, a second transverse rotatable shaft, a linkage interconnecting said shafts for conjoint movement and cams fixed to the second of said transverse shafts organized to be rotated into position to obstruct movement of others of said operating levers.

3. In a dual cockpit airplane having flight control surfaces and operating levers in the systems controlling said surfaces, a control lock mechanism disposed in one cockpit comprising a transverse rotatable shaft, a pilot operated member for rotating said shaft, a socket member fixed to rotate with said shaft adapted to receive in locking engagement a first of said operating levers, a second transverse rotatable shaft, a linkage interconnecting said shafts for conjoint rotation, cams fixed to the second of said transverse shafts organized to be rotated into position to obstruct movement of the second said operating levers, a cable drum fixed to one of said transverse shafts, tension means urging said shaft and its attached drum and cams away from said obstructing position, a cable extending from said drum into the other of the two cockpits and a hand grip terminating said cable whereby the occupant of said second cockpit may lock the second said operating levers by maintaining pull on said grip and cable, and rotation of said drum and associated shaft into said obstructing position.

4. In an airplane having a manually operated flight control lever and a pedal-operated rudder control, the said rudder control including coaxially mounted members disposed between said pedals and said rudder adapted for rotation in opposite directions upon operation of either of said rudder pedals, a locking assembly including means to lock said manual control lever and cam means interconnected with and actuated by said manual control lever lock adapted to engage and centralize said members and maintain said rudder control system in a fixed position.

5. In an airplane having dual pilot control positions, two interconnected manual controls, two interconnected pedal operated controls, pivoted locking mechanism associated with one of said manual controls adapted to lock the same with respect to the airplane, rotatable elements interconnected with said manual control locking mechanism adapted upon the locking of said manual control to be rotated into positions such that they engage and centralize said rudder control system in a fixed position and further locking means accessible to the other said pilot position connected to said rotatable elements adapted to unlock and lock both said manual- and pedal-operated controls.

6. In an airplane having a manually operated flight control lever and a pedal-operated rudder control, the said rudder control including oppositely rotatable members interconnected between said rudder pedals and said airplane rudder, a locking assembly including means to lock said manual control lever and cam means interconnected with and actuated by said manual control lever lock adapted to engage said members for maintaining said rudder control system in a locked relationship with respect to said airplane.

7. In an airplane control system having a manually-operated flight control and a pedal-operated rudder control, the said flight control including a control stick pivotally mounted at its lower portion and having a free upper portion, the said rudder control including a movable element interconnected with the airplane rudder, a locking assembly for the manual- and pedal-operated controls including means movably supported upon the airplane adapted to engage and fix said free end of said control stick to the airplane, and rotatable cam locking means interconnected with and actuated by said control stick lock adapted to wedgingly engage said movable element for preventing movement of said rudder control with respect to the airplane.

8. In a dual-control airplane having tandem arranged cockpits, manually-operated flight control levers in both of said cockpits and a rudder control having operating pedals in both said cockpits, the said rudder control including an element movably carried upon said airplane and interconnected between said rudder pedals and the airplane rudder, a locking assembly for said airplane control system including means to fix the foremost said manual control lever to the airplane, locking means interconnected with and actuated by said manual control lever lock adapted to engage said movable element for maintaining said rudder control in a fixed relationship with respect to said airplane, and means accessible from the rearmost of said cockpits interconnected with said locking means adapted to selectively cause engagement of said locking means and to initiate release of both said forward control lever and said pedal-operated control.

9. In aircraft having movable flight control surfaces together with a manual control element connected to move said flight control surfaces and a pedal control system connected to move another of said flight control surfaces, a locking system for fixing said flight control surfaces in predetermined positions with respect to the aircraft comprising locking means for directly engaging the upper free terminal of said manual control element, said locking means including a pivotally mounted detent adapted for movement into said engagement with said manual control element, and rotatable means conjointly operated by the said locking means adapted to automatically render said pedal control system inoperable upon rotation initiated by pivotal movement of said locking means for the fixation of each of said flight control surfaces with respect to the aircraft.

10. In a dual control airplane having a pair of control sticks and a rudder operating system, a control lock mechanism comprising a locking member operable to directly engage the first said control stick to prevent operation thereof, a rudder lock mechanism engageable with said rudder operating system to prevent movements thereof including an interconnection between said control locking member and said rubber locking mechanism adapted to provide conjoint operational movement thereof, manually actuatable means adjacently disposed with respect to said first control stick directly connected to move said control locking member for engagement therewith and alternate manually actuatable means adjacent said second control stick operable to actuate said rudder lock and to move said control locking member in cooperation with said interconnection, whereby both said control sticks and said rudder operating system is lockable from either of the dual control positions.

11. In a tandem cockpit airplane having interconnected dual flight controls in each cockpit for exercising lateral, longitudinal and directional control, a locking system for all of said control instrumentalities adapted for operation from either of said cockpits comprising a member operable to directly engage the forward instrumentality affecting lateral and longitudinal control, rotatable means operatively interconnected with said member and automatically engageable with the control instrumentality affecting directional control initiated by said first direct engagement, and manually actuated means accessible to the rear cockpit adapted to alternatively and similarly impart rotation to said rotatable means directly engageable with said directional control instrumentality for the locking thereof, and through said interconnection with said member to similarly lock said front and rear lateral and longitudinal control instrumentalities.

12. In an airplane having a set of rudder pedals, operating mechanism interconnecting said pedals for simultaneous and opposite operation thereof, said mechanism including pivotally mounted members movable upon operation of either of said rudder pedals, and rudder locking means including rotatable cam means selectively engageable with said members for preventing said pivotal movement thereof and thereby locking said rudder pedals.

13. In a dual control airplane having two sets of rudder pedals operable from spaced operating positions, operating mechanism interconnecting corresponding pedals of each set for conjoint operation thereof, said mechanism including pivotally mounted members, rudder locking means including a pair of rotatable cams selectively engageable with said members for preventing pivotal movement thereof, and manually actuatable means accessible to each of said operating positions for the actuation of said locking means.

ARSENE BONDAR.